Figure 1:
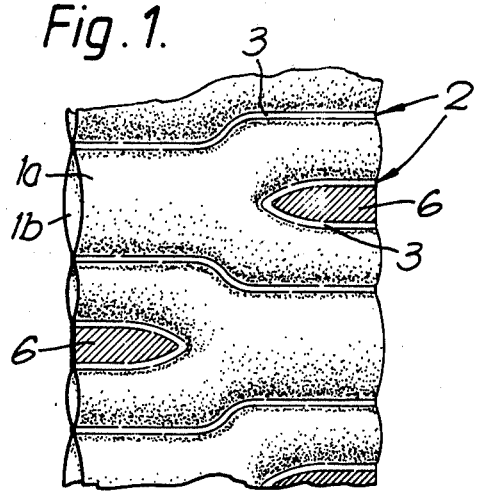

United States Patent [19]

Changani et al.

[11] 4,345,957

[45] Aug. 24, 1982

[54] POLYMERIC ARTICLES

[75] Inventors: Pushpkumar D. Changani, Swindon; Donald G. Peacock, Kempsford; David Roberts, Broome Manor Swindon, all of England

[73] Assignee: Raychem Corporation, Menlo Park, Calif.

[21] Appl. No.: 172,899

[22] Filed: Jul. 28, 1980

[51] Int. Cl.³ .................... H02G 15/18; H02G 1/14; B29C 27/24; H05B 3/10
[52] U.S. Cl. ................................. 156/218; 156/86
[58] Field of Search ...................... 156/52, 81–86, 156/218, 290–294

[56] References Cited

U.S. PATENT DOCUMENTS

| | | |
|---|---|---|
| 518,403 | 6/1955 | Goodwin . |
| 3,022,543 | 2/1962 | Baird, Jr. et al. . |
| 3,239,125 | 3/1966 | Sherlock .................. 228/56 |
| 3,243,211 | 3/1966 | Wetmore ................. 287/78 |
| 3,253,618 | 5/1966 | Cook ........................ 138/125 |
| 3,253,619 | 5/1966 | Cook et al. .............. 138/125 |
| 3,305,625 | 2/1967 | Ellis .......................... 174/84 |
| 3,316,343 | 4/1967 | Sherlock .................. 174/84 |
| 3,382,121 | 5/1968 | Sherlock .................. 156/165 |
| 3,396,894 | 8/1968 | Ellis .......................... 228/56 |
| 3,448,182 | 6/1969 | Derbyshire .............. 264/22 |
| 3,451,609 | 6/1969 | Gillett ...................... 228/56 |
| 3,501,565 | 3/1970 | Kalwaites ................ 264/288 |
| 3,525,799 | 8/1970 | Ellis .......................... 174/84 |
| 3,654,017 | 4/1972 | Ropiequet ................ 156/251 |
| 3,678,174 | 7/1972 | Ganzhorn ................ 174/84 R |
| 3,721,749 | 3/1973 | Clabburn ................. 174/88 R |
| 3,818,123 | 6/1974 | Maltz ....................... 174/88 C |
| 3,872,194 | 3/1975 | Lowry ...................... 264/22 |
| 3,899,807 | 8/1975 | Sovish ...................... 24/255 C |
| 3,948,709 | 4/1976 | Ida ............................ 156/209 |
| 3,949,110 | 4/1976 | Nakajima et al. . |
| 3,949,110 | 4/1976 | Nakajima ................. 428/36 |
| 3,995,964 | 12/1976 | De Groef ................. 403/272 |
| 4,085,286 | 4/1978 | Horsma et al. .......... 156/86 X |
| 4,101,699 | 7/1978 | Stine ......................... 428/36 |
| 4,118,260 | 10/1978 | Boettcher ................ 156/85 |
| 4,123,047 | 10/1978 | Koht et al. . |

FOREIGN PATENT DOCUMENTS

| | | |
|---|---|---|
| 1154280 | 4/1958 | France . |
| 2004578 | 11/1969 | France . |
| 2114005 | 6/1972 | France . |
| 2374463 | 7/1978 | France . |
| 2444392 | 12/1979 | France . |
| 990235 | 4/1965 | United Kingdom . |
| 1010064 | 11/1965 | United Kingdom . |
| 1046367 | 10/1966 | United Kingdom . |
| 1062043 | 3/1967 | United Kingdom . |
| 1062709 | 3/1967 | United Kingdom . |
| 1062870 | 3/1967 | United Kingdom . |
| 1098304 | 1/1968 | United Kingdom . |
| 1116878 | 6/1968 | United Kingdom . |
| 1116879 | 6/1968 | United Kingdom . |
| 1149125 | 4/1969 | United Kingdom . |
| 1178166 | 1/1970 | United Kingdom . |
| 1223967 | 3/1971 | United Kingdom . |
| 1284082 | 8/1972 | United Kingdom . |
| 1286460 | 8/1972 | United Kingdom . |
| 1294665 | 11/1972 | United Kingdom . |
| 1342202 | 1/1974 | United Kingdom . |
| 1357549 | 6/1974 | United Kingdom . |
| 1545386 | 5/1979 | United Kingdom . |
| 20225157 | 1/1980 | United Kingdom . |

*Primary Examiner*—John E. Kittle
*Attorney, Agent, or Firm*—James W. Peterson; Herbert G. Burkard

[57] ABSTRACT

A process for the production of a hollow heat-recoverable article provided with a functional insert which comprises deforming a substantially non-crosslinked polymeric material at a temperature below the crystalline melting point or softening point of the material to render the material heat-recoverable, disposing said functional insert in contact with an exposed portion of said material, fusing together parts of the deformed material or a part or parts of the material and at least one other polymeric component to produce at least one hollow heat-recoverable article with the functional insert located therein and subsequently cross-linking the substantially non-cross-linked polymeric material.

11 Claims, 13 Drawing Figures

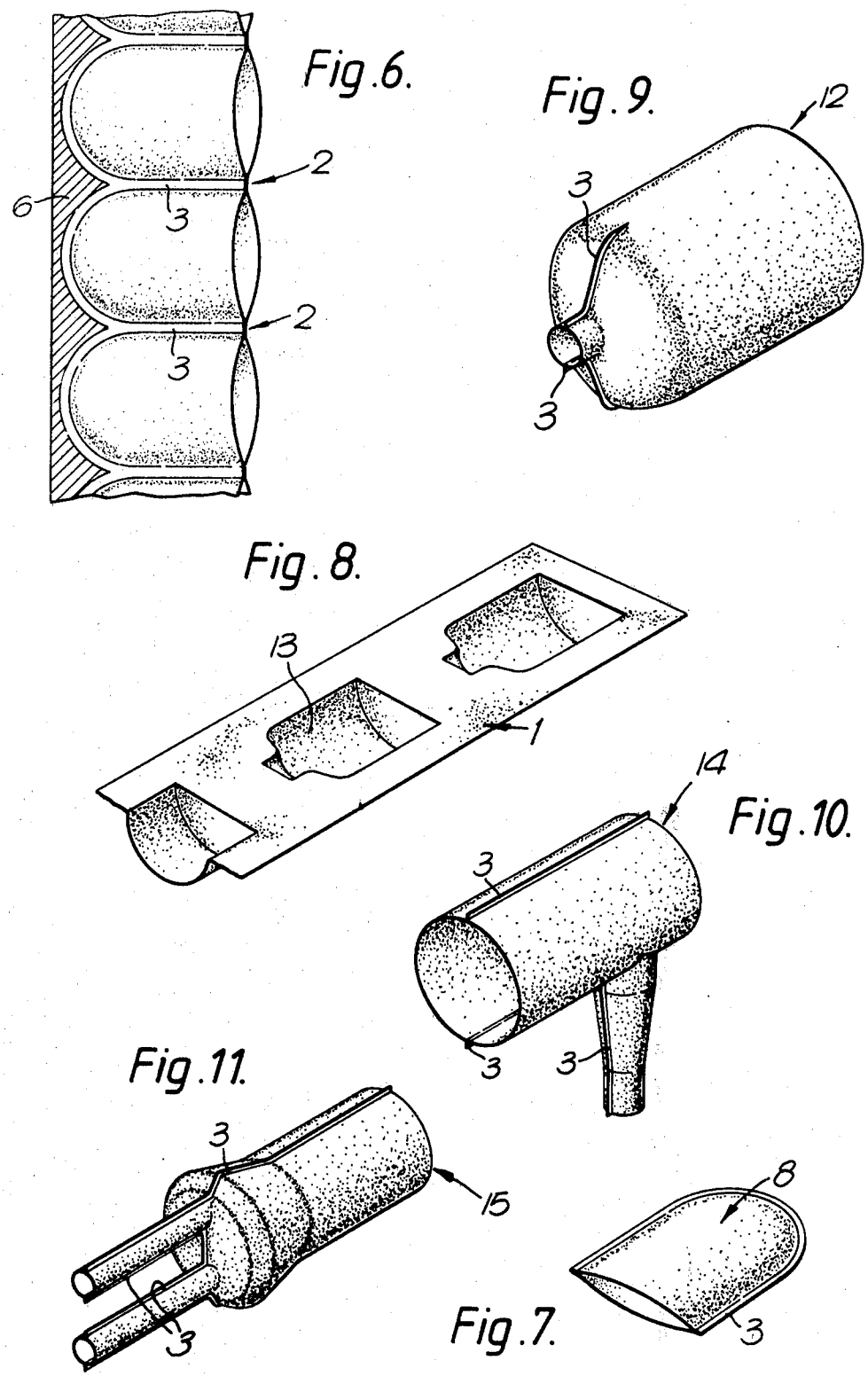

POLYMERIC ARTICLES

The present invention concerns hollow heat-recoverable polymeric articles, that is to say, hollow polymeric articles the dimensional configuration of which may be made to change by subjecting to heat, and in particular, to such articles provided with a functional insert therein such as an adhesive, sealant, electrically conductive or semi-conductive or solder insert.

Hitherto, hollow heat-recoverable articles have generally been produced by forming a polymer into the desired heat stable configuration, simultaneously or subsequently cross-linking the polymer in its heat stable configuration, heating the article, deforming the article and cooling the article whilst in the deformed state so that the deformed configuration is retained. In use, since the deformed state of the article is heat unstable, application of heat will cause the article to revert or tend to revert to its original heat stable configuration.

When it is desired to provide such articles with a functional insert, then in general, it has hitherto frequently been necessary to provide such inserts after the completion of the article on an item-by-item basis, e.g. by way of a manual or semi-automatic finishing process. Even when automatic or continuous methods have been available, e.g. in the case of internally coated articles produced by coextrusion methods, such methods are expensive. Frequently, however, the hollow articles are of such configuration that they cannot be produced directly by extrusion for example electrical boots, udders (a term employed herein in a general sense to cover any hollow heat-shrinkable article comprising at least 3 outlets employed in the termination of electrical cables and also commonly referred to as cable "breakouts") or endcaps (a hollow tubular article having a smoothly tapering sealed end) for electric cables, and have been formed into the desired heat stable configuration on an item-by-item basis by moulding, e.g. by injection, compression or transfer moulding techniques.

It is an object of the present invention to provide a process of producing a hollow heat-recoverable article provided with a functional insert which obviates or reduces the above-mentioned difficulties.

Accordingly, the present invention provides a process for the production of a hollow heat-recoverable article provided with a functional insert which comprises deforming a substantially non-cross-linked polymeric material at a temperature below the crystalline melting point or softening point of the material to render the material heat-recoverable, disposing said functional insert in contact with an exposed portion of said material, fusing together parts of the deformed material or a part or parts of the material and at least one other polymeric component to produce at least one hollow heat-recoverable article with the functional insert located therein and subsequently cross-linking the substantially non-cross-linked polymeric material.

By the expression "fusing together" as employed herein is meant a process wherein the materials in the parts to be fused together are caused to flow together, e.g. welding by heat, solvent, or ultrasonic or radio frequency energy, preferably with the application of pressure, to form a homogeneous bridge between the parts in the absence of any discernible interface therebetween.

The process is applicable to both crystalline and non-crystalline polymers, the crystalline melting point or softening point being selected accordingly as the maximum deformation temperature.

By "substantially non-cross-linked" polymeric materials as employed herein is meant not cross-linked to the extent that the material cannot be readily bonded to itself or to another polymeric component by fusing. In general, the level of cross-linking in the polymeric material expressed in terms of gel content (ANSI/ASTM D2765-68) is preferably less than 40%, more preferably less than 20%, particularly less than 5%. When cross-linking in accordance with the process, preferably gel contents of at least 40%, e.g. at least 50%, particularly at least 65% are attained.

Of particular interest is a process for the production of a plurality of hollow heat-recoverable articles each provided with a functional insert therein, especially such articles which cannot be produced directly by extrusion, which comprises deforming a substantially non-cross-linked polymeric material at a temperature below the crystalline melting point or softening point of the material to render the material heat-recoverable, disposing said functional insert(s) in contact with an exposed portion of said material, fusing together parts of the deformed material or a part or parts of the material and at least one other polymeric component to define a plurality of separable hollow heat-recoverable articles each having a functional insert located therein and cross-linking the product before or after separating the hollow heat-recoverable articles.

Hollow heat-recoverable articles produced by the process of the invention also form part of the present invention. One advantage of the articles of the invention is that they are substantially recoverable, e.g. recoverable to at least 50% of their maximum extent, at a temperature below the crystalline melting point or softening point of the polymeric material from which they have been produced, e.g. in the range 60° C. to the crystalline melting point or softening point.

The process is particularly useful in the manufacture of heat-recoverable boots, transitions, solder connector sleeves, udders and end-caps for electrical applications, e.g. electrical cables, the use of such products being extensive and well reported in the literature e.g. Proc. IEE 1970, 117(7), 1365–1372. Such products may, for example, be provided with a functional insert in the form of an adhesive, sealant or electrically semi-conducting coating or liner or a quantity of solder, in accordance with the process of the invention by welding together two superimposed pre-stretched polymeric webs or the two superimposed flaps of a single folded pre-stretched polymeric web after having been pre-coated, lined or otherwise provided with a functional insert material. The polymeric material may be deformed in any direction which will provide the desired direction of recovery in the final product which, in the case of boots, transitions, sleeves, udders and end-caps, is preferably radially inward shrinkage in relation to the substrate to which they are applied and, more preferably, in the substantial absence of shrinkage longitudinally in relation to said substrate. Such shrinkage may be achieved by mono-axial deformation of the polymeric material.

In the production of heat-recoverable articles in accordance with the invention, it is not always necessary to deform the whole of the non-cross-linked polymeric starting material. For example, when employing polymeric material in the form of a web, it is possible locally to deform specific areas of the web, for example, to thermoform by pressing or by vacuum forming at an elevated temperature below the crystalline melting point or softening point of the material with subsequent cooling to maintain the deformed condition of the deformed components so formed. Such deformed components may then be fused to other components, for example to a similar component formed in a separate web, to produce the configuration of the desired product.

The functional insert may comprise any material that is desired to be located internally of the hollow heat-recoverable article to perform any desired function. One type of insert is fusible at or around the recovery temperature of the article, e.g. a hot-melt adhesive, or a solder insert, as described for example in UK Pat. Nos. 1,062,043, 1,062,709, 1,062,870, 1,098,304 and 1,149,125, the disclosures of which are incorporated herein by reference. A second type of insert is a sealant, e.g. a highly viscous liquid, paste or grease, as described for example, in UK Pat. Nos. 1,116,878 and 1,116,879 the disclosures of which are incorporated herein by reference. A third type of insert is a barrier, e.g. a water barrier such as an aluminium foil liner. A fourth type of insert is an electrical screen, for example, a liner in the form of an electrically conducting braid or foil.

The manner in which the functional insert is disposed on the deformed polymeric material will naturally depend on the type of insert employed. In the case where the insert is an adhesive or sealant coating, the coating may be applied to the whole of the deformed polymeric material and the adhesive or sealant in the regions to be fused together displaced, e.g. by local heating and application of pressure.

If self-adhesion of adhesive or sealant-coated contacting parts is a problem, then such parts may be separated by a non-adherable material such as release paper.

Any cross-linkable polymeric material to which the property of dimensional recoverability may be imparted such as those disclosed in UK Pat. No. 990,235 may be used to form the articles. Polymers which may be used in the polymeric material include polyolefins such as polyethylene and polypropylene, and ethylene copolymers, for example with propylene, butene, hexene, octene, vinyl acetate or other vinyl esters or methyl or ethyl acrylate, polyamides, polyurethanes, polyvinyl chloride, polyvinylidine fluoride, or other fluorinated polymers or copolymers, e.g. Tefzel (trade name—commercially available from Dupont), elastomeric materials such as those disclosed in UK specification No. 1,010,064 and blends such as those disclosed in UK specification Nos. 1,284,082 and 1,294,665 and compositions such as those disclosed in our co-pending Applications Nos. 15122/77 and 37468/78. The polymeric materials can be tailored to suit the intended use by the addition of fillers, e.g. semi-conducting fillers or antitracking agents, flame retardants, plasticisers, pigments, stabilisers and lubricants, or where necessary, e.g. where the polymeric material is substantially non-crystalline, a hold-out agent such as a thermoplastic polymer, e.g. polyethylene, may be included in the material.

The polymeric material may be cross-linked by irradiation, for example, by means of an electron beam or by Y-radiation or it may be chemically cross-linked. Whichever cross-linking process is used, it may be advantageous to incorporate one or more co-curing agents for example polyunsaturated monomers such as triallyl cyanurate, triallyl isocyanurate, diallyl phthalate, ethylene glycol dimethacrylate, trimethylolpropane trimethacrylate, pentaerythritol tetramethacrylate, allyl methacrylate and vinyl methacrylate. One method of chemical cross-linking that may be used in the process according to the invention involves grafting an unsaturated hydolysable silane on the polymer and subjecting the article to moisture during a curing stage, for example, as described in UK Pat. Nos. 1,286,460 and 1,357,549.

Any of the techniques conventionally employed for fusing together polymeric materials may be employed in the process of the present invention, e.g. radio frequency, ultrasonic or hot bar welding, and pressure may additionally be applied to ensure a satisfactory bond. Furthermore, it is possible to make use of the fusing operation to separate the articles one from another or from surplus polymeric starting material. For example, it is possible to use a heating/cutting device such as a hot wire cutter or a laser beam, if necessary in association with pressure applying means such as a roller.

As hereinbefore described, the process is particularly appropriate in the production of hollow heat-recoverable articles for use in the electrical field, e.g. boots, transitions, sleeves, udders and end-caps. In general, such products are characterised by a wall thickness prior to heat-recovery thereof of at least 0.05 mm, preferably from 0.1 to 5 mm, especially from 0.5 to 3 mm e.g. 1 to 3 mm.

Figure 2:
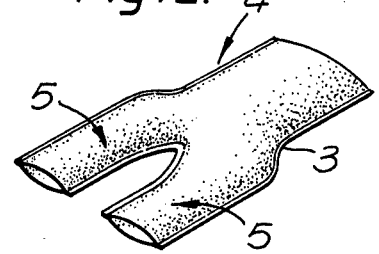
Figure 3:
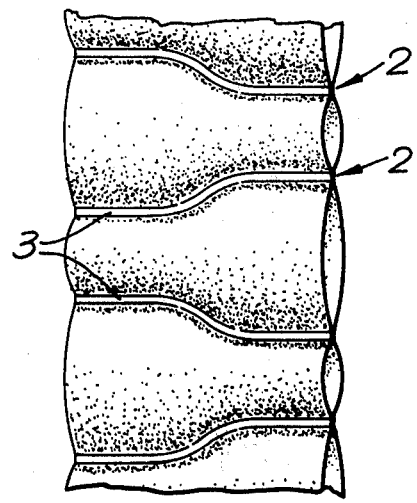
Figure 4:
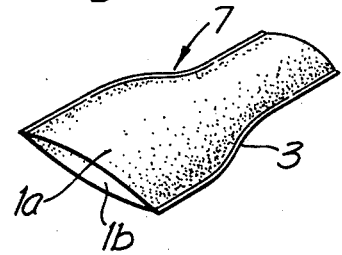
Figure 5:
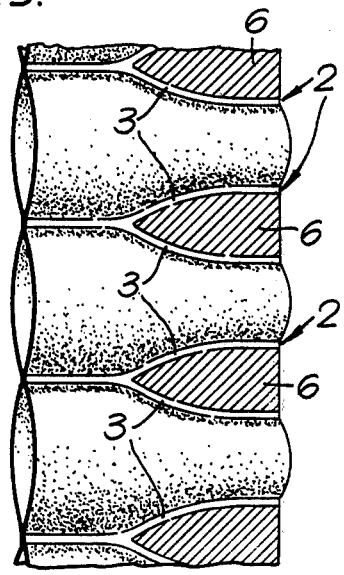
Figure 12:
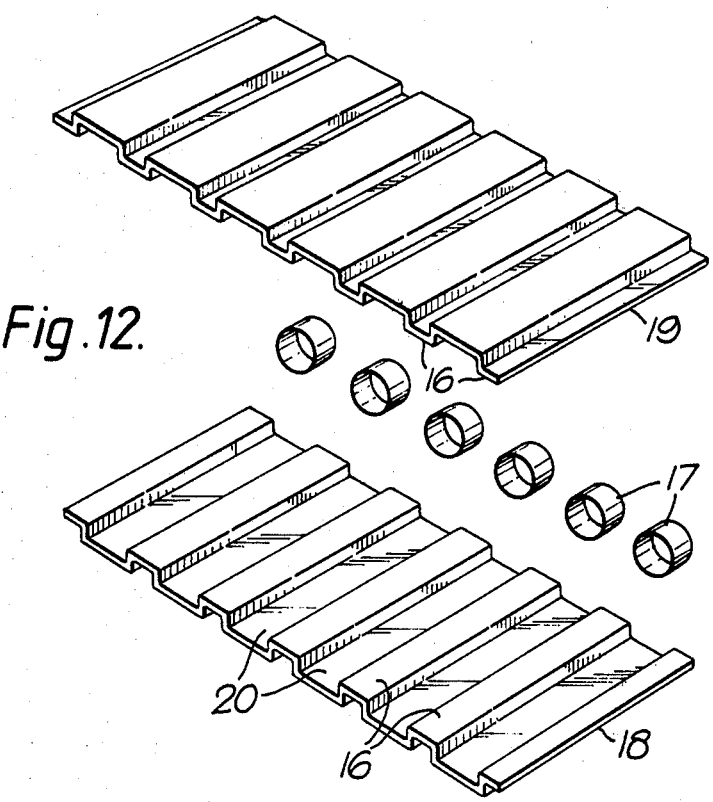
Figure 13:
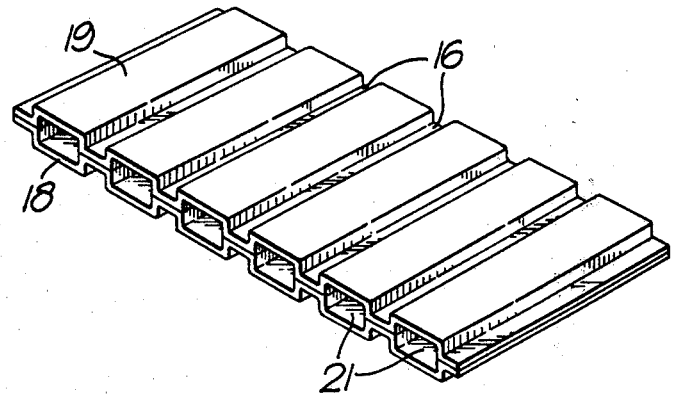

Specific embodiments of the process of the invention will now be described by way of example with specific reference to the accompanying drawings wherein:

FIG. 1 is a schematic top view of an assembly of separable heat-recoverable udders for the termination of an electrical cable, FIG. 2 is a diagrammatic isometric view of an udder produced from the assembly shown in FIG. 1, FIG. 3 is a schematic top view of an assembly of separable heat-recoverable boots employed for sealing an electrical cable at the termination thereof, FIG. 4 is a diagrammatic isometric view of a boot produced from the assembly of FIG. 3, FIG. 5 is a schematic top view of an alternative assembly of separable heat-recoverable boots from which the boot of FIG. 4 may be produced, FIG. 6 is a schematic top view of an assembly of separable heat-recoverable end-caps employed for sealing the ends of electrical cables, FIG. 7 is an isometric view of an end cap produced from the assembly of FIG. 6, FIG. 8 is a schematic isometric view of a polymeric web of material that has been locally deformed to produce a heat-recoverable transition for an electrical cable, FIG. 9 is an isometric view of the transition produced from the deformed web of FIG. 8, FIG. 10 is an isometric view of a right angle electrical boot produced in analogous manner to that depicted in FIG. 8, FIG. 11 is an isometric view of a 2-legged udder produced in analogous manner to that depicted in FIG. 8, FIG. 12 is an exploded isometric view of a heat-recoverable solder-containing connector sleeve assembly, and, FIG. 13 is an isometric view of the connector assembly of FIG. 12.

In the embodiment shown in FIGS. 1 and 2, a pair of polyethylene sheets 1 which have been expanded longitudinally to 3 times their original length at a temperature 100° C., coated with a hot-melt adhesive which is insensitive to the subsequent irradiation treatment (see below) and cooled whilst in the expanded condition, are superimposed one on the other and welded at positions 2 transversely of the tube through the hot-melt adhesive. The regions of the sheet at positions 2 to be welded together are locally pre-heated and pressed together by suitably located heated rollers engageable with the sheets causing the adhesive in the region to be welded to flow and be displaced prior to welding with an ultrasonic welding tool to produce welded seams 3. The welded sheets are then irradiated in a 1.5 MeV electron beam at a dosage of 12 Mrads causing cross-linking of the polyethylene. After cross-linking, the assembly is severed along the weld seams 3 employing a mechanical cutter to produce a plurality of internally adhesive coated heat-recoverable electrical udders 4 each having two legs 5 defined by the welds 3. The areas depicted by reference numeral 6 are discarded.

Such udders may be employed in the electrical termination of a cable comprising two primary wires by heat-recovering the udder about the end of the cable, the primary wires passing through the legs of the udder.

In analogous manner to that described in relation to the first embodiment the transitions and end-caps shown in FIGS. 3, 4 and 5 and FIGS. 6 and 7 respectively are produced, hereinafter the same reference numerals being employed for analogous parts.

In the embodiment shown in FIG. 8, a method of producing electrical boots 12 shown in FIG. 9 is illustrated. In this embodiment a sheet of non-cross-linked non-expanded polyethylene 1 is heated to a temperature of 100° C. and passed over a series of vacuum moulds. After application of vacuum, the sheet is impressed with a plurality of expanded areas 13 corresponding in shape to one half of the boot to be produced. The interior of the boot half is then coated with a hot-melt adhesive and after cooling, the sheet is removed from the mould and superimposed on a similarly processed sheet of complimentary form such that the half-boots of one sheet are in register with the half-boots of the other. Each complimentary and registering pair of half-boots are thereafter welded together and the whole boots so formed are separated from the surrounding area by severing along the welds 3 and also across the ends to produce the boots in their final form as illustrated in FIG. 9. The articles so formed are thereafter irradiated in an electron beam as hereinbefore described.

By employing appropriate vacuum moulds and similar adhesive coating methods, the electrical boots of FIG. 10 and the two legged udders of FIG. 11 are produced.

In the embodiment depicted in FIGS. 12 and 13, a heat-recoverable solder containing flat cable connector analogous to that described in UK Pat. No. 1,334,556, the disclosure of which is incorporated herein by reference, is produced from two substantially non-cross-linked polyethylene sheets 18 and 19 which have been deformed by stretching to 3 times their original length and then corrugated by thermoforming at this temperature with subsequent rapid cooling. In each channel 20 so defined in one sheet 18 is placed a ring of prefluxed solder maintained in position by a small quantity of pressure sensitive adhesive (not shown) and thereafter the other sheet 19 is superimposed on the lower sheet such that the peaks 16 of the corrugations of one sheet are in register with those of the other sheet to define a series of parallel interlinked solder containing sleeves 21. The sheets 18 and 19 are then welded together along the contacting peaks 16 employing an ultrasonic welding tool to produce the assembly shown in FIG. 12.

In a modification of the preceding embodiment, the solder rings are not provided, the channels 20 being coated with a hot-melt adhesive. In this manner, a very efficient and simple manner of producing adhesive coated sleeves is provided. If desired, the sleeves may be separated one from another by severing along the weld seams employing a conventional cutting tool.

In each of the preceding embodiments, the wall thickness of the polyethylene after deformation may be 0.05 mm, 0.1 mm, 0.5 mm, 1.0 mm, 1.5 mm, 2.0 mm, 2.5 mm, 3.0 mm, 3.5 mm, 4.0 mm, 4.5 mm and 5.0 mm with similar results.

We claim:

1. A process for the production of a hollow heat-recoverable article provided with a functional insert, the steps comprising:
    deforming a substantially non-cross-linked polymeric material at a temperature below the crystalline melting point or softening point of the material to render the material heat-recoverable primarily in one direction;
    disposing a functional insert in contact with an exposed portion of said material;
    fusing together parts of the deformed material to at least one other non-cross-linked polymeric component said fusing being done along lnes substantially perpendicular to the direction of polymeric material heat-recoverability to produce at least one hollow radially inwardly heat-recoverable article with the functional insert located therein; and,
    cross-linking the fused portions of the polymeric material.

2. A process according to claim 1 wherein the non-cross-linked polymeric material is in the form of a longitudinally expanded polymeric web which is fused to a superimposed analogous web to produce the configuration of the desired article.

3. A process according to claim 1 wherein the non-cross-linked polymeric material is in the form of a non-expanded polymeric web which is locally deformed in at least one region thereof, said deformed region being fused to the deformed region of an analogous web to produce the configuration of the desired article.

4. A process according to claim 3 wherein said web is locally deformed by vacuum forming.

5. A process according to claim 1 wherein the polymeric material prior to deformation has a wall thickness of at least 0.05 mm.

6. A process according to claim 1 wherein the functional insert comprises an adhesive.

7. A process according to claim 1 wherein the functional insert comprises a sealant.

8. A process according to claim 1 wherein the functional insert comprises a conductive or semiconductive composition.

9. A process according to claim 1 wherein the functional insert comprises a quantity of solder.

10. A process according to claim 1 wherein the resulting article is shaped in non-planer.

11. A hollow heat-recoverable article produced by the process of claim 1.

* * * * *